June 7, 1966 J. T. RODNEY 3,254,903
SEMI-TRAILER HAVING ADJUSTABLE KING PIN
Filed Feb. 3, 1964 2 Sheets-Sheet 1

INVENTOR.
JOHN T. RODNEY
BY
*Lucillian Freeman*
ATTORNEY

June 7, 1966 J. T. RODNEY 3,254,903
SEMI-TRAILER HAVING ADJUSTABLE KING PIN
Filed Feb. 3, 1964 2 Sheets-Sheet 2
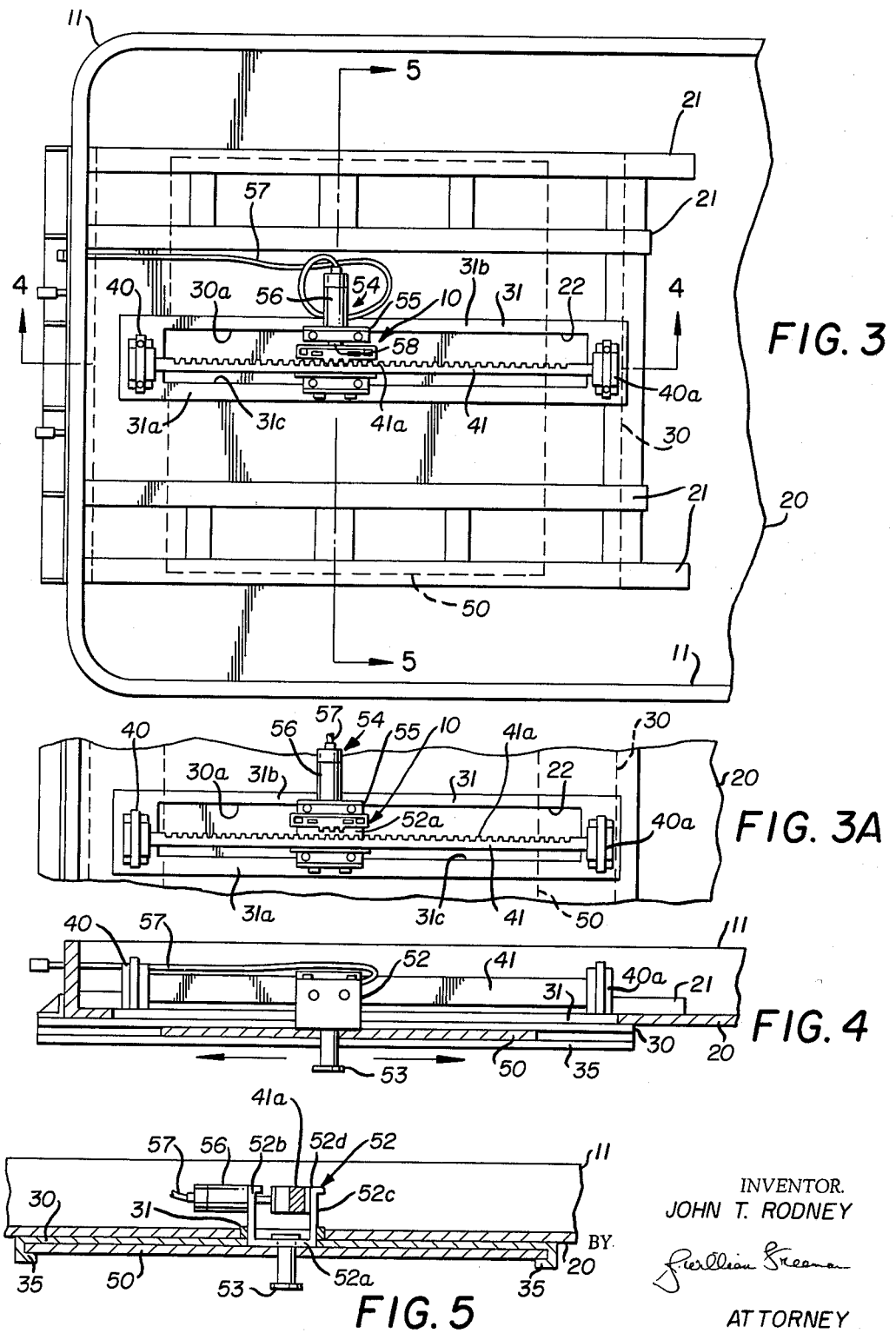
INVENTOR.
JOHN T. RODNEY
BY
ATTORNEY

United States Patent Office 3,254,903
Patented June 7, 1966

3,254,903
SEMI-TRAILER HAVING ADJUSTABLE KING PIN
John T. Rodney, Rte. 1, New Milford, Ohio
Filed Feb. 3, 1964, Ser. No. 342,069
4 Claims. (Cl. 280—407)

This invention relates to the art of highway tractor trailer construction, and in particular has reference to an improved type of trailer having a king pin member that is shiftable relatively of the trailer so as to permit adjustment with respect to the point of attachment between trailer and towing truck.

The concept of providing an adjustable king pin on a semi-trailer body is, in general, known in the art.

While the prior art discloses the general concept of shifting the king pin relatively of the trailer body for known purposes, it has been found that the prior art is limited at the present time in certain respects.

In this regard, it should first be noted that, while the prior art does teach adjustment generally such adjustment is normally provided at only a minimum number of mounting points. Thus, some of the prior art shows two position adjustment such as between front and rear positions, while other prior art shows means for adjusting at widely spaced points so that fine adjustment is generally not possible.

Additionally, the prior art has, of necessity, been relatively complex for the purpose of providing means to prevent rotation between the adjustable king pin and the trailer body.

It has been discovered that the disadvantages can be obviated by providing a king pin assembly that can be positioned at a substantially infinite number of positions within its range of adjustment so as to permit precise locking of the king pin at any desired point with respect to the trailer body.

It has further been discovered that the operating structure can be greatly simplified by providing guide ways that serve the dual function of precluding rotation of the king pin, while simultaneously permitting shifting thereof over a limited range.

It has still further been discovered that the operability of the unit in question can be enhanced by having the same operated electrically from the truck cab so that when the proper position of support is obtained, the operator can lock the king pin in place with respect to the trailer body without the necessity for leaving the cab of the towing vehicle.

Production of an improved semi-trailer having an adjustable king pin possessing the above advantages accordingly becomes the principal object of this invention, with other objects of the invention becoming more apparent upon a reading of the following brief specification, considered and interpreted in the light of the accompanying drawings.

Of the drawings:

FIGURE 3 is a plan view of the improved adjustable king pin assembly showing the assembly in locked condition.

FIGURE 3a is a view similar to FIGURE 3 showing the assembly in unlocked position.

FIGURES 4 and 5 are vertical sections taken on the lines 4—4 and 5—5 of FIGURE 3.

Figure 1:
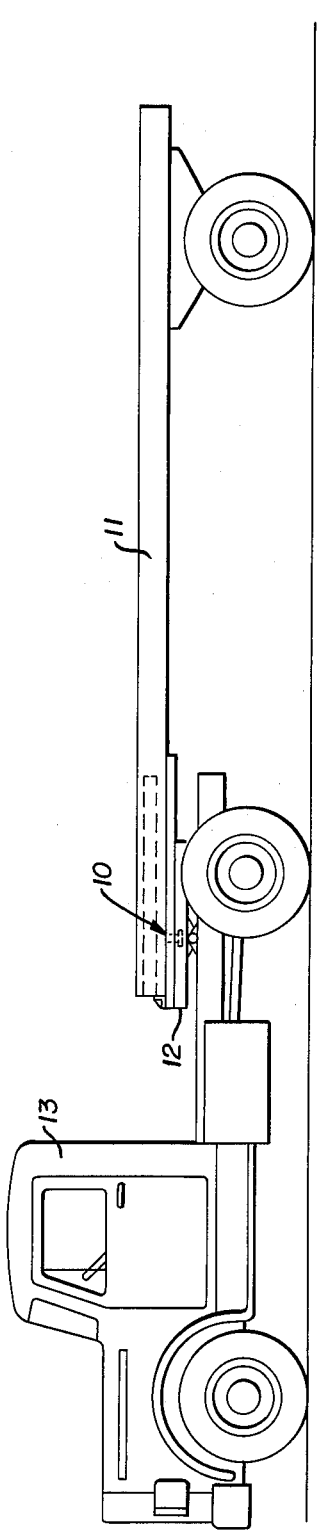
FIGURE 1 is a slide elevation schematically illustrating the adjustable king pin assembly positioned in its forwardmost condition with respect to the trailer body.
Figure 2:
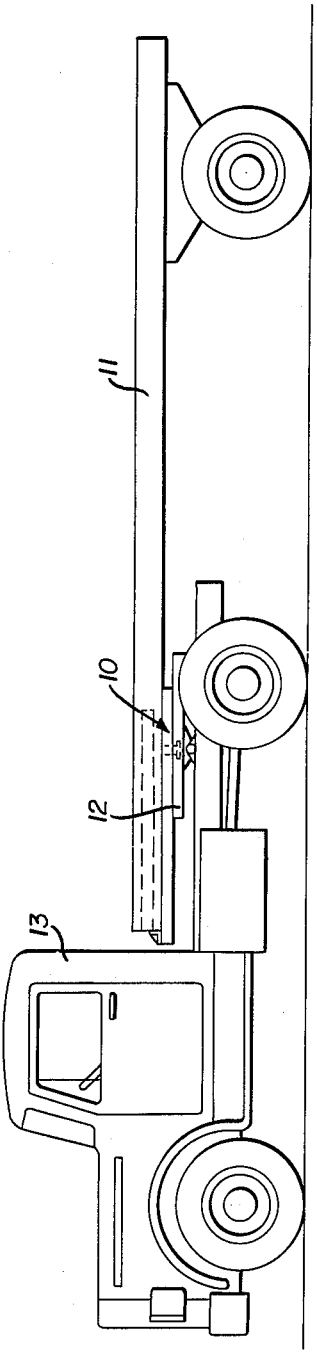
FIGURE 2 is a view similar to FIGURE 1, but showing the king pin assembly positioned in its rearmost position with respect to the trailer body.

Referring now to the drawings, and in particular to FIGURES 1 and 2 thereof, the improved adjustable king pin assembly, generally designated by the numeral 10, is shown shiftably mounted on the forwardmost end of the bed frame of a trailer body 11 so as to be engageable with the conventional fifth wheel assembly 12 that is provided in known fashion on the towing vehicle 13, with this arrangement of component parts permitting shifting of the connection point between the positions of FIGURES 1 and 2 so as to either expand or contract the over-all length of the truck trailer unit.

Referring next to FIGURE 3, the improved adjustable king pin assembly 10 is shown mounted on the bed frame 20 of the trailer body 11 with the unit 10 being positioned between the usual re-enforcing ribs 21, 21 that are provided on the forward end of the trailer for strengthening purposes in known fashion. In this regard, it is preferably to be understood that the unit shown in compact enough in size so as to be received between the usual adjacent ribs 21, 21 without the necessity of materially altering the trailer body.

To this end, in order to modify a conventional trailer, it is only required that the bed frame 20 of trailer body 11 be provided with a through elongated slot 22 followed by securing support plate 30 to the bottom of bed frame 20. This support plate 30, which is generally rectangular in configuration, has an over-all dimension substantially equal to that of the bed frame 20 and further has an elongate through aperture 30a disposed therein.

Disposed on the top surface of support plate 30 is an auxiliary plate 31 which is welded or otherwise secured to plate 30 or is integral thereto and with this auxiliary plate 31 having guide rails 31a and 31b extending longitudinally of support plate 30 when assembled. Plate 31 has an over-all dimension approximately equal to the dimension of aperture 22 and it should be noted here that this auxiliary plate 31 has a complementary elongate aperture 31c so that when auxiliary plate 31 is secured to support plate 30, apertures 30a and 31c will be in alignment.

Also secured to auxiliary plate 31 adjacent the longitudinal ends thereof are support members 40 and 40a which project from auxiliary plate 31 substantially perpendicular thereto so that when support plate 30 is secured to the bottom of bed frame 20, apertures 22, 30a and 31c will be in alignment, and further, auxiliary plate 31, support members 40 and 40a and guide rails 31a and 31b will project through aperture 22 to a position slightly above the top surface of frame 20. The support members 40 and 40a also receive the opposed ends of elongate guide frame 41 that spans the distance therebetween and that has a gear rack 41a provided throughout the greater extent of its length for purposes to be described below. Also included on support plate 30 are depending L-shaped guide rails 35, 35 which extend from the bottom of plate 30 along the longitudinal axis of said plate 30 and which are disposed adjacent the edges thereof.

Disposed within the aforementioned guide rails 35, 35 is a shifting plate 50, with it being understood that this plate has its opposed peripheral side edges slidably received within the L-shaped guide rails 35, 35.

Shifting plate 50 also includes the usual king pin 53 projecting from its bottom surface for engagement with fifth wheel assembly 12 in known fashion. This king pin 53 also projects upwardly slightly above the top surface of shifting plate 50 for engagement with an aperture in guide block 52 as will be described. In this regard, guide block 52 is disposed on the top surface of shifting plate 50 and is of generally U-shaped configuration so as to have a base portion 52a and leg portions 52b and 52c, with base portion 52a being secured to plate 50 by king pin 53. Leg 52b carries locking element 54 which includes a multi-toothed locking head member 55 that is shiftably mounted on leg 52b so as to be actuated by solenoid 56 between the locked position of FIGURE 3 and the unlocked position of FIGURE 3a with solenoid 56 having a flexible connection 57 that will facilitate operation of the same from the interior of the cab upon electric connection between the cab and trailer in known fashion. Remaining leg 52c has a flange 52d designed to be slidably received between frame 41 and guide rail 31a as will be described below.

It should be understood that shifting plate 50 has its peripheral edges received in guide rails 35, 35 and further that guide block 52 projects through the aligned aperture 22, 30a and 31c so that leg 52b is disposed on one side of guide frame 41, while leg 52c is disposed on the other side thereof so that flange 52d rides on guide rail 31a and so that locking member 54 carried by leg 52b will be positioned between guide rail 31b and guide frame 41 for releasable meshing with guide frame 41.

It will be noted that owing to this construction, upon unlocking of the locking head 55 carried by locking element 54 (FIGURE 3a), shifting plate 50 may move longitudinally relatively of bed frame 20, and that upon locking of element 54 with guide frame 41, longitudinal movement will be prohibited by the meshing of the teeth of frame element 41 and locking element 54, while lateral or rotational movement of shifting plate 50 will be precluded by contact between guide rails 35 and the lateral edges of plate 50.

In use or operation of the improved adjustable king pin, it will first be understood that the component parts will be normally positioned as shown in FIGURE 3, with the teeth of the locking head 55 being meshed with the gear rack 41a so as to preclude shifting of the king pin 53 relatively of the bed frame and of support plate 30. In this condition, the fifth wheel unit can be backed into place and connected with the king pin followed by making of the hydraulic and electrical connections between the cab and towing vehicle. At this or any other subsequent time, the king pin can be shifted relatively of the body 11 merely by operating the solenoid 56 to retract the locking head 55 from its meshed condition with the gear rack 41a. When such retraction has been accomplished, the trailer wheels can be locked in place and the towing vehicle moved either forwardly or rearwardly, as desired, to effectuate a shifting of the relative positions of the trailer body 11 and towing vehicle 13, with it being apparent by this arrangement that any intermediate position between the positions of FIGURES 1 and 2 can be achieved as desired. When the desired position is achieved, as just described, it is merely necessary to inactivate the solenoid 56 whereupon the locking head 55 will return to the meshed condition with gear rack 41a, as shown in FIGURE 3, whereupon the vehicle is ready for operation.

It will be seen from the foregoing that there has been provided a new and improved type of adjustable king pin assembly that is selectably positionable over a wide range in extremely small increments of adjustment to thus give maximum flexibility for most efficient towing results.

It will also be apparent that the invention above described can be readily adapted to existing trailers without materially modifying the construction of the same. In this regard, it is merely necessary that a slot 22 be cut in the bed frame and that an apertured support plate 30 be provided on the bed frame. Guide rails and a gear rack carried by the support plate will project through the aperture of the bed frame. Since the support plate will also shiftably carry the shifting plate 50 and locking member 55, the only other operation will be the securing of the solenoid to flexible connection 57.

It should also be noted that while solenoid 56 has been shown as the means for operating locking member 55, the same could be operated manually if desired. Furthermore, while the locking head 55 has been shown as being shiftable on rod 58, it should be noted that dual rods disposed adjacent the opposed ends of locking head 55 could be employed for greater stability. Similarly, the number of teeth included on said head could be increased for improved locking.

It will further be noted that the size and compactness of the assembly permits its use between the conventional re-enforcing ribs that are normally present on all trailers in this region.

While a full and complete description of the invention has been set forth in accordance with the patent statutes, it is to be understood that the invention herein described is not intended to be limited to the specific embodiments herein shown.

Accordingly, modifications of the invention may be resorted to without departing from the spirit hereof or the scope of the appended claims.

What is claimed is:

1. A semi-trailer of the character described, comprising;
   (A) an elongate trailer body including
      (1) a bed frame having a centrally disposed, forwardly located slot extending longitudinally of said bed frame;
   (B) a support plate secured to said bed frame and including a pair of guide ways secured thereto and being disposed in parallel on opposite sides of said slot;
   (C) a shifting plate overlying said slot and having its edges received in said guide ways whereby said plate may move longitudinally of said slot in said guide ways;
   (D) a king pin secured to said shifting plate and projecting from one face thereof to a position that is beneath said bed frame and in alignment with said slot;
   (E) an elongated frame member
      (1) having its opposed ends secured to said support plate, and
      (2) being aligned with said slot and being spaced above said bed frame;
   (F) a guide block secured to said shifting plate and projecting from the opposed face thereof to a position above said bed frame, with said guide block being received in said slot and being slidingly engageable with said elongated frame member;
   (G) and locking means precluding relative movement between said elongated frame member and said guide block; said locking means preventing movement of said shifting plate relatively of said bed frame.

2. The device of claim 1 further characterized by the fact that said frame member includes a gear rack, while said guide block includes at least one dog element shiftably carried thereby and being releasably engageable with said gear rack.

3. A semi-trailer of the character described, comprising;
   (A) an elongate trailer body including
      (1) a bed frame having a centrally disposed, forwardly located slot extending longitudinally of said bed frame;
   (B) a support plate secured to said bed frame and including a pair of guide ways secured thereto and being disposed in parallel on opposite sides of said slot;
   (C) a shifting plate overlying said slot and having its edges received in said guide ways whereby said plate may move longitudinally of said slot in said guide ways;
   (D) a king pin secured to said plate and projecting from one face thereof to a position that is beneath said bed frame and in alignment with said slot;
   (E) locking means
      (1) carried by said support plate and said shifting plate, and (2) projecting through said slot in said bed frame, and
(3) being adapted to prevent movement of said shifting plate relatively of said bed frame.

4. An adjustable king pin device for use on an elongate trailer body having a forwardly located elongate slot, comprising;
  (A) a support plate adapted to be secured to said trailer body and having
    (1) an elongate slot therein substantially aligned with said elongate slot in said trailer body during the period of time said support plate is secured to said body, and
    (2) a pair of guide ways on said plate disposed in parallel relationship on opposite sides of said slots;
  (B) a shifting plate overlying said slot and having its edges received in said guide ways
    (1) whereby said plate may move longitudinally of said slot in said guide ways;
  (C) a king pin secured to said shifting plate and projecting from one face thereof to a position beneath said bed frame substantially in line with said slots; and
  (D) locking means
    (1) carried by said support plate and said shifting plate, and
    (2) projecting through said slot in said bed frame, and
    (3) being adapted to prevent movement of said shifting plate relatively of said bed frame.

References Cited by the Examiner

UNITED STATES PATENTS

| | | | |
|---|---|---|---|
| 2,889,154 | 6/1959 | De Lay | 280—407 |
| 2,976,051 | 3/1961 | Morey | 280—405 |

LEO FRIAGLIA, *Primary Examiner.*